United States Patent [19]

Pemberton

[11] 4,048,863
[45] Sept. 20, 1977

[54] FRICTION DRIVE

[76] Inventor: Robert E. Pemberton, R.R. No. 2, Box 123, Edinburg, Ind. 46124

[21] Appl. No.: 699,487

[22] Filed: June 24, 1976

[51] Int. Cl.$^2$ ............................ F16H 7/00; F16H 7/18
[52] U.S. Cl. .................................... 74/229; 74/230.7; 74/235; 74/236; 74/250 R
[58] Field of Search ................ 74/235, 236, 248, 249, 74/250 R, 229, 230.5, 230.7

[56] References Cited

U.S. PATENT DOCUMENTS

| 1,194,962 | 8/1916  | Crowe   | 74/235   |
| 1,500,458 | 7/1924  | Keen    | 74/235   |
| 1,548,863 | 8/1925  | Bolle   | 74/235   |
| 1,878,797 | 9/1932  | Morse   | 74/236   |
| 1,904,498 | 4/1933  | McGhee  | 74/230.7 |
| 2,224,068 | 12/1940 | Togel   | 74/236   |
| 3,592,511 | 7/1971  | Hudelson| 74/230.7 |

FOREIGN PATENT DOCUMENTS

| 128,141 | 1/1932 | Austria | 74/230.175 |
| 586,187 | 3/1925 | France  | 74/235     |

Primary Examiner—Samuel Scott
Assistant Examiner—Allan R. Burke
Attorney, Agent, or Firm—Jenkins, Hanley & Coffey

[57] ABSTRACT

A friction drive having a drive wheel with annular friction bands peripherally mounted on opposed sides thereof. A friction chain comprises a plurality of inverted generally V-shaped friction links swingably interconnected in series by side plates. The friction chain is receivable about the drive wheel with the V-shaped links matingly and frictionally engaging the friction bands.

11 Claims, 3 Drawing Figures

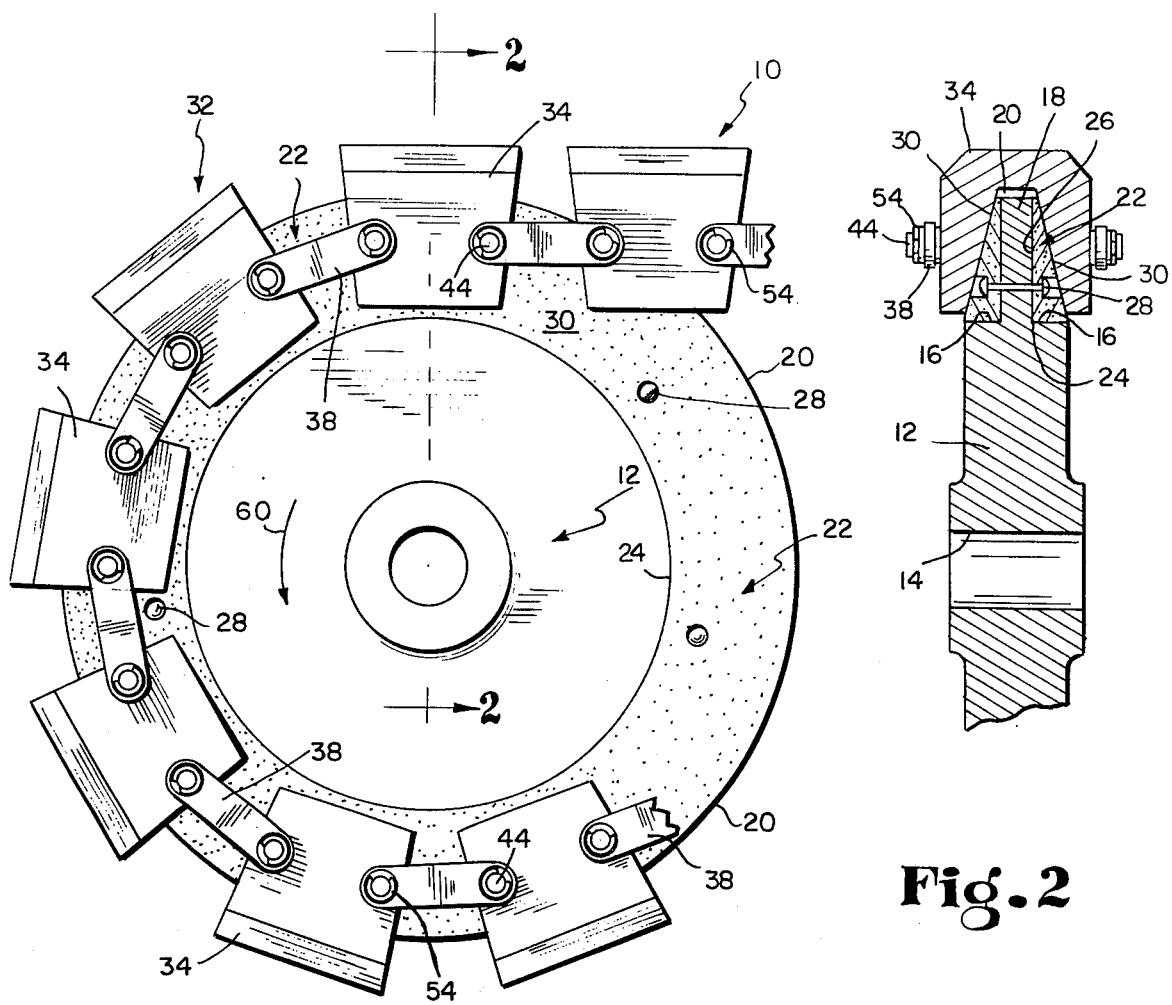
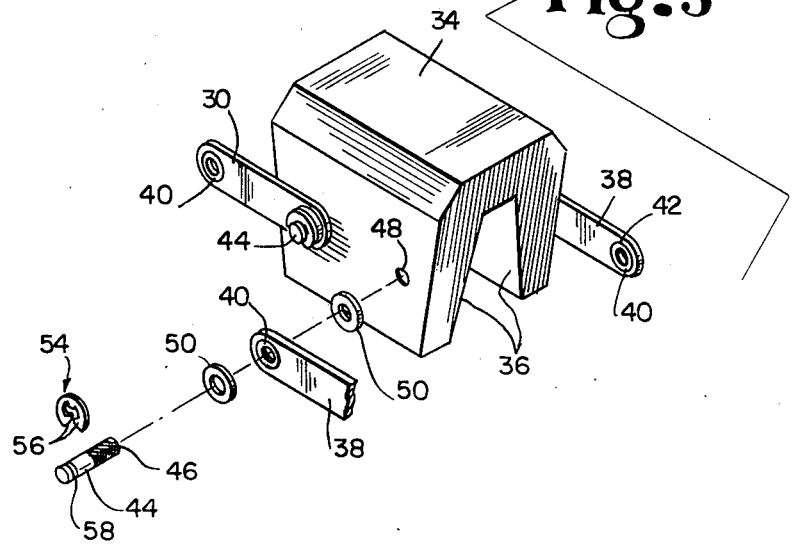

FRICTION DRIVE

BACKGROUND OF THE INVENTION

This invention relates to chain drives. More specifically, this invention relates to a friction drive chain and a drive wheel therefor.

In the prior art, a wide variety of chains and chain drives are available. Typically, such chain drives comprise a chain formed from interconnected roller links having rollers carried on journal pins. The chain is receivable about a sprocket wheel between spaced peripheral teeth with the rollers being carried in the spaces between the teeth during operation. However, such chain drives require careful matching of the chain and sprocket wheel as well as relatively slow operating speeds to assure proper and accurate operation. Further, the use of sprocket wheels is not altogether desirable since high quality sprocket wheels are manufactured by expensive machining processes. Moreover, prior art chains typically comprise a plurality of moving parts which require periodic lubrication for continued operation.

Belt and pulley assemblies have been substituted for chain drives in some applications because of the elimination of chain rollers and expensive sprocket wheels, and because belt and pulley assemblies are relatively maintenance free. Further, belt and pulley assemblies are advantageous in that they can operate at running speeds considerably higher than chain drives. However, belt and pulley assemblies are greatly limited in load capacity and undesirably tend to slip at high load conditions or upon starting.

The friction drive of this invention overcomes the problems and disadvantages of the prior art by providing a chain drive wherein the sprocket wheel teeth and lubrication-dependent rollers are eliminated. Moreover, the friction drive of this invention provides the smooth-running, high-speed capabilities of belt and pulley assemblies without corresponding load or slipping problems.

SUMMARY OF THE INVENTION

In accordance with the invention, a friction drive comprises a drive wheel with a smooth, circular-shaped outer perimeter. Annular friction bands formed from brake lining material or the like are mounted about the outer periphery of the drive wheel on opposite sides thereof. These bands have an angularly disposed side face inclined radially outwardly and axially inwardly from its base to the outer peripheral edge to form a generally V-shaped radial cross section at the drive wheel periphery.

A drive chain for the wheel comprises a plurality of interconnected friction links. Each friction link has a generally inverted V-shaped cross section with angularly disposed inside faces for mating engagement with the angular side faces of the friction bands on the drive wheel. The V-shaped friction links are pivotally interconnected in series by a plurality of side plates to form a continuous chain with the friction links being trained over the peripheral edge of the drive wheel in frictional engagement with the friction bands. Thus, in operation, the friction links are continuously engaged and released by the friction bands upon rotation of the drive wheel.

BRIEF DESCRIPTION OF THE DRAWINGS

The accompanying drawings illustrate the invention. In such drawings:

FIG. 1 is a fragmented elevation view of the friction drive of this invention;

FIG. 2 is a fragmented vertical section taken on the line 2—2 of FIG. 1; and

FIG. 3 is a partially exploded perspective view showing assembly of the friction chain.

DETAILED DESCRIPTION OF THE PREFERRED EMBODIMENT

The friction drive 10 of this invention is shown in FIGS. 1 and 2, and comprises a drive wheel 12 having a central axial opening 14 for reception over a suitable spindle shaft (not shown) for either rotatably driving the wheel, or for allowing rotation thereof. The drive wheel 12 is formed from steel or the like, and has matched radially outwardly presented shoulders 16 on opposite sides thereof. The shoulders 16 together define an annular outwardly projecting drive wheel ring 18 of narrowed thickness which terminates in a smooth-surfaced perimeter face 20.

An annular friction band 22 is mounted on each side of the drive wheel 12 adjacent the perimeter thereof. Each friction band 22 is formed from a suitable smooth-surfaced high coefficient of friction material, such as conventional brake-lining material. The bands 22 each have a smooth inside diameter base 24 disposed perpendicularly with a flat axially inwardly presented side face 26 to allow the band 22 to be firmly seated against the associated drive wheel shoulder 16 and the ring 18. The two bands 22 are fixed on the drive wheel by rivets 28 received through the bands 22 and ring 18, and countersunk into the bands. Alternately, if deisired, the bands 22 can be mounted on the wheel 12 by a suitable adhesive such as an eposy resin.

The friction bands 22 each have an axially outwardly presented side face 30 providing a friction driving surface, as will be hereafter described in more detail. Each of these side faces 30 is inclined radially outwardly and axially inwardly from its base to its outer edge to provide the drive wheel with a generally V-shaped peripheral cross section. In a preferred embodiment, the friction band side faces 30 are angled at from about 10° to about 30°, and preferably about 15°.

A chain 32 for use with drive wheel 12 comprises a plurality of identical friction links 34. Each link 34 is formed from metal or the like as by a suitable casting or stamping, and has a generally inverted V-shaped cross section. This provides each of the links 34 with a pair of angularly oriented inside faces 36. Importantly, these angular inside faces 36 are formed to correspond with the angular faces 30 of the friction bands 22 on the drive wheel 12. Accordingly, in practice, the friction link inside faces 36 are angled from an imaginary vertical reference line passing through the link 34 at an angle of from about 10° to about 30°, and preferably about 15°.

The plurality of friction links 34 are interconnected in series to form the chain 32 by a plurality of connecting side plates 38, as shown best in FIG. 3. As shown, each side plate comprises a length of metal stock or the like having a bushing 40 press-fit therein near each end thereof. Each of the bushings 40 comprises a self-lubricating bushing such as a porous bronze bearing known as an Oilite bearing. The bushings 40 each have an opening 42 formed therethrough for reception of a journal pin 44.

Each journal pin 44 has a stem 46 knurled for press-fitting reception into a matingly formed hole 48 in one of the friction links 34, with one of said holes being formed near each end of the link 34 on both sides thereof. The link 34 is coupled to the side plates by sandwiching one end of a side plate 38 between a pair of metal washers 50, and then press-fitting the knurled journal pin stem 46 through the two washers and the associated bushing 40 and into the link hole 48. The washers 50 and the side plate 38 are retained on the journal pin 44 by a U-shaped spring clip 54 having inwardly directed fingers 56 received in a groove 58 in the outer extent of the journal pin.

This process is repeated until a side plate 38 is swingably mounted on the friction link 34 at each of the four corners thereof. Then, the chain 32 is assembled by coupling the two forwardly projecting side plates 38 in a similar manner to an adjacent friction link, and then coupling the two rearwardly projecting side plates in a similar manner to another adjacent friction link. In this manner, the assembled chain 32 comprises a plurality of serially and swingable connected friction links.

The assembled chain 32 is trained about the drive wheel 12, as shown in FIG. 1, with the inverted V-shaped friction links 34 in frictional engagement with the friction bands 22. With this construction, during operation, the friction links 34 serially engage the friction band 22 one at a time and are carried about the wheel 12 as the wheel rotates, for example, in the direction shown by arrow 60. Importantly, frictional engagement of each link 34 with the bands 22 is smooth and rapid with little or no surface wear to thereby substantially reduce the hazard of chain breakage. There is essentially no slipping or other wearing movement of the friction links 34 with respect to the drive wheel 12. Further, as the links 34 are carried off of and away from the drive wheel 12, frictional release of the links is smooth and rapid. Accordingly, the chain runs smoothly and is therefore capable of high-speed operation under load conditions limited only by the coefficient of friction of the friction bands 22, with little or no detrimental wear or vibration. The chain drive is usable in substantially any environmental condition such as open air, oil, water, etc., since the only moving part of the chain is carried in a self-lubricating bushing. Moreover, each link 34 is independently locked frictionally with the drive wheel 12 to prevent links from flying off the wheel in the event of chain breakage.

I claim:

1. A friction drive comprising, in combination, a wheel having an annular friction band mounted thereon adjacent the wheel outer periphery on each outer axial side thereof; and a chain having a plurality of pivotally connected friction links trained over the wheel perimeter, said links being shaped for mating frictional engagement with said friction bands upon rotation of said wheel.

2. A friction drive as set forth in claim 1 wherein said wheel has a smooth-surfaced outer periphery.

3. A friction drive as set forth in claim 1 wherein said wheel has a radially outwardly presented shoulder on each axial side thereof, said wheel having radially outwardly projecting annular wheel ring of narrowed axial thickness between said shoulders, each of said friction bands having an inner diameter base and an axially inwardly presented side face for seating against the associated shoulder and the ring, respectively, of said wheel.

4. A friction drive as set forth in claim 1 wherein each of said friction bands has an axially outwardly presented side face, an inner diameter base, and an outer peripheral edge, said side face being inclined radially outwardly and axially inwardly from its base to its peripheral edge so that the friction bands and wheel together form a generally V-shaped cross section at the wheel outer periphery.

5. A friction drive as set forth in claim 4 wherein the axially outwardly presented side face of each of said friction bands is inclined from the plane of the wheel at an angle of from about 10° to about 30°.

6. A friction drive as set forth in claim 4 wherein each of said friction links is shaped to have a generally inverted V-shaped cross section for mating frictional engagement with the angle side faces of said friction bands.

7. A friction drive as set forth in claim 4 wherein each of said friction links has opposed inner faces together forming a generally V-shaped cross section, said friction link inner faces being angularly oriented for mating frictional engagement with the inclined side faces of said friction bands.

8. A friction drive as set forth in claim 1 wherein said friction links are pivotally connected in series by a plurality of side plates each pivotally connected to a pair of said links.

9. A friction drive as set forth in claim 8 wherein each of said side plates has a self-lubricating bushing mounted thereon adjacent each of opposed ends thereof, and with the addition of a journal pin received within each of said bushings, said journal pin being coupled to one of said friction links and having means for retaining the bushing thereon to provide a self-lubricating chain.

10. A friction drive comprising, in combination, a wheel, an annular friction band concentrically mounted on each outer axial side of said wheel adjacent the outer periphery thereof, each of said friction bands having an axially outwardly presented side face inclined axially inwardly from its inner diameter base to its outer diameter edge so that the wheel and bands together form a generally V-shaped radial cross section adjacent the wheel periphery; and a chain having a plurality of pivotally interconnected friction links each having a generally inverted V-shaped cross section and being receivable over the wheel perimeter for mating frictional engagement with said friction bands upon rotation of the wheel.

11. A friction drive comprising, in combination, a wheel having an axially and peripherally extending, radially outwardly presented shoulder on each axial side thereof, said wheel having a radially outwardly projecting annular wheel ring of reduced axial thickness; a pair of annular friction bands each having an inside diameter base and an axially inwardly presented side face for seating of said band on the shoulder and ring, respectively, on one side of said wheel, each of said friction bands having an axially outwardly presented side face inclined axially inwardly from its base to its outer peripheral edge; means for mounting said friction bands on said wheel so that the bands and wheel ring together form a generally V-shaped radial cross section; and a chain having a plurality of pivotally interconnected friction links each having a generally inverted V-shaped transverse cross section and being receivable over the drive-wheel perimeter for mating frictional engagement with said friction bands upon rotation of the wheel.

* * * * *